United States Patent
Kim

(10) Patent No.: US 10,756,847 B2
(45) Date of Patent: Aug. 25, 2020

(54) ELECTRONIC DEVICE AND METHOD FOR DETECTING ERROR THEREOF

(71) Applicant: SAMSUNG ELECTRONICS CO., LTD., Suwon-si, Gyeonggi-do (KR)

(72) Inventor: Shin-Ho Kim, Uiwang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 156 days.

(21) Appl. No.: 15/846,722

(22) Filed: Dec. 19, 2017

(65) Prior Publication Data

US 2018/0183546 A1 Jun. 28, 2018

(30) Foreign Application Priority Data

Dec. 22, 2016 (KR) .................... 10-2016-0176618

(51) Int. Cl.
*H04L 1/00* (2006.01)
*H04L 29/08* (2006.01)

(52) U.S. Cl.
CPC .......... *H04L 1/0061* (2013.01); *H04L 1/0045* (2013.01); *H04L 69/324* (2013.01)

(58) Field of Classification Search
CPC .... H04L 1/0061; H04L 69/324; H04L 1/0045
See application file for complete search history.

(56) References Cited

U.S. PATENT DOCUMENTS

| 6,460,145 | B1* | 10/2002 | Sassa | G11C 29/88 714/5.1 |
| 8,862,966 | B2 | 10/2014 | Nygren et al. | |
| 9,501,041 | B2 | 11/2016 | Shim et al. | |
| 2003/0229839 | A1* | 12/2003 | Wang | H04L 1/004 714/776 |
| 2004/0035939 | A1* | 2/2004 | Lin | G06K 7/0021 235/487 |
| 2004/0243906 | A1* | 12/2004 | Huang | G06F 11/1068 714/758 |
| 2007/0174727 | A1* | 7/2007 | Liao | H03L 7/1976 714/43 |
| 2008/0248692 | A1* | 10/2008 | Ni | G06K 19/07732 439/607.01 |
| 2008/0276037 | A1* | 11/2008 | Chang | G06F 3/0613 711/103 |
| 2009/0157932 | A1* | 6/2009 | Hayashita | G06F 13/4291 710/110 |

(Continued)

FOREIGN PATENT DOCUMENTS

KR 10-2016-0042496 4/2016
KR 10-1617374 5/2016

*Primary Examiner* — Guy J Lamarre
(74) *Attorney, Agent, or Firm* — Nixon & Vanderhye P.C.

(57) ABSTRACT

An example electronic device may include an interface module including a communication terminal for single-wire communication, an error detection circuit connected to the communication terminal, and at least one processor operatively coupled to the error detection circuit. The at least one processor monitors an output of the error detection circuit located between the communication terminal and the at least one processor while receiving a packet from an external electronic device when performing single-wire communication with the external electronic device connected through the interface module, and detects whether an error occurs based on a result of the monitoring.

20 Claims, 9 Drawing Sheets

(56) References Cited

U.S. PATENT DOCUMENTS

| | | | |
|---|---|---|---|
| 2012/0017016 A1* | 1/2012 | Ma | G06F 13/426 710/110 |
| 2012/0032528 A1* | 2/2012 | Toyama | G06F 1/26 307/130 |
| 2013/0181660 A1* | 7/2013 | Zhou | H02J 7/00 320/107 |
| 2016/0156431 A1* | 6/2016 | El-Wailly | H04L 1/004 714/57 |
| 2017/0139467 A1* | 5/2017 | Waters | G06F 1/3287 |

\* cited by examiner

ELECTRONIC DEVICE AND METHOD FOR DETECTING ERROR THEREOF

CROSS-REFERENCE TO RELATED APPLICATION

This application is based on and claims the benefit under 35 U.S.C. § 119 of a Korean patent application filed in the Korean Intellectual Property Office on Dec. 22, 2016 and assigned Serial No. 10-2016-0176618, the contents of which are incorporated by reference herein in their entirety.

BACKGROUND

1. Technical Field

The present disclosure relates generally to an electronic device and an error detection method thereof.

2. Description of Related Art

Electronic devices (e.g., a mobile terminal, a smart phone, a wearable electronic device, and the like) may provide various functions. For example, a smart phone may provide short-distance wireless communication (e.g., Bluetooth, Wireless Fidelity (WiFi), Near Field Communication (NFC), and the like), mobile communication ($3^{rd}$ Generation (3G), $4^{th}$ Generation (4G), $5^{th}$ Generation (5G), and the like), a music and/or video playback function, an image capturing function, a navigation function, a messenger function, and the like.

The electronic devices may be connected to other electronic devices through wired communication. For example, electronic devices may be connected to each other through a Universal Serial Bus (USB) interface. Recently, there is an increase in the number of electronic devices for supporting a USB type-C standard. An electronic device for supporting the USB type-C standard may perform Power Delivery (PD) communication through a Configuration Channel (CC) terminal.

SUMMARY

However, in case of PD communication, data is transmitted/received in a time-division manner by using one communication line. Accordingly, PD communication has a problem in that it is difficult to increase a communication speed. Further, in general, PD communication may detect an error through a Cyclical Redundancy Check (CRC) after performing demodulation, decoding, or the like of a received data (packet). Accordingly, PD communication has a problem in that much time may be required for error detection.

Various example embodiments of the present disclosure may provide an electronic device capable of rapidly and effectively performing error detection, and also provide an error detection method thereof.

According to various example embodiments of the present disclosure, an electronic device may include an interface module including a communication terminal for single-wire communication, an error detection circuit connected to the communication terminal, and at least one processor operatively coupled to the error detection circuit. The at least one processor may monitor an output of the error detection circuit located between the communication terminal and the at least one processor while receiving a packet from an external electronic device when performing single-wire communication with the external electronic device connected through the interface module, and may detect whether an error occurs based on a result of the monitoring.

According to various example embodiments of the present disclosure, an error detection method of an electronic device may include detecting a connection of an external electronic device through an interface module including a communication terminal for single-wire communication, performing single-wire communication with the connected external electronic device, monitoring an output of an error detection circuit located between the communication terminal and at least one processor while receiving a packet from the external electronic device, and detecting whether an error occurs based on a result of the monitoring.

According to various example embodiments of the present disclosure, a computer-readable recording medium storing at least one instruction is configured to allow at least one processor to perform at least one operation when executed by the at least one processor. The at least one operation may include detecting a connection of an external electronic device through an interface module including a communication terminal for single-wire communication, performing single-wire communication with the connected external electronic device, monitoring an output of an error detection circuit located between the communication terminal and at least one processor while receiving a packet from the external electronic device, and detecting whether an error occurs based on a result of the monitoring.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
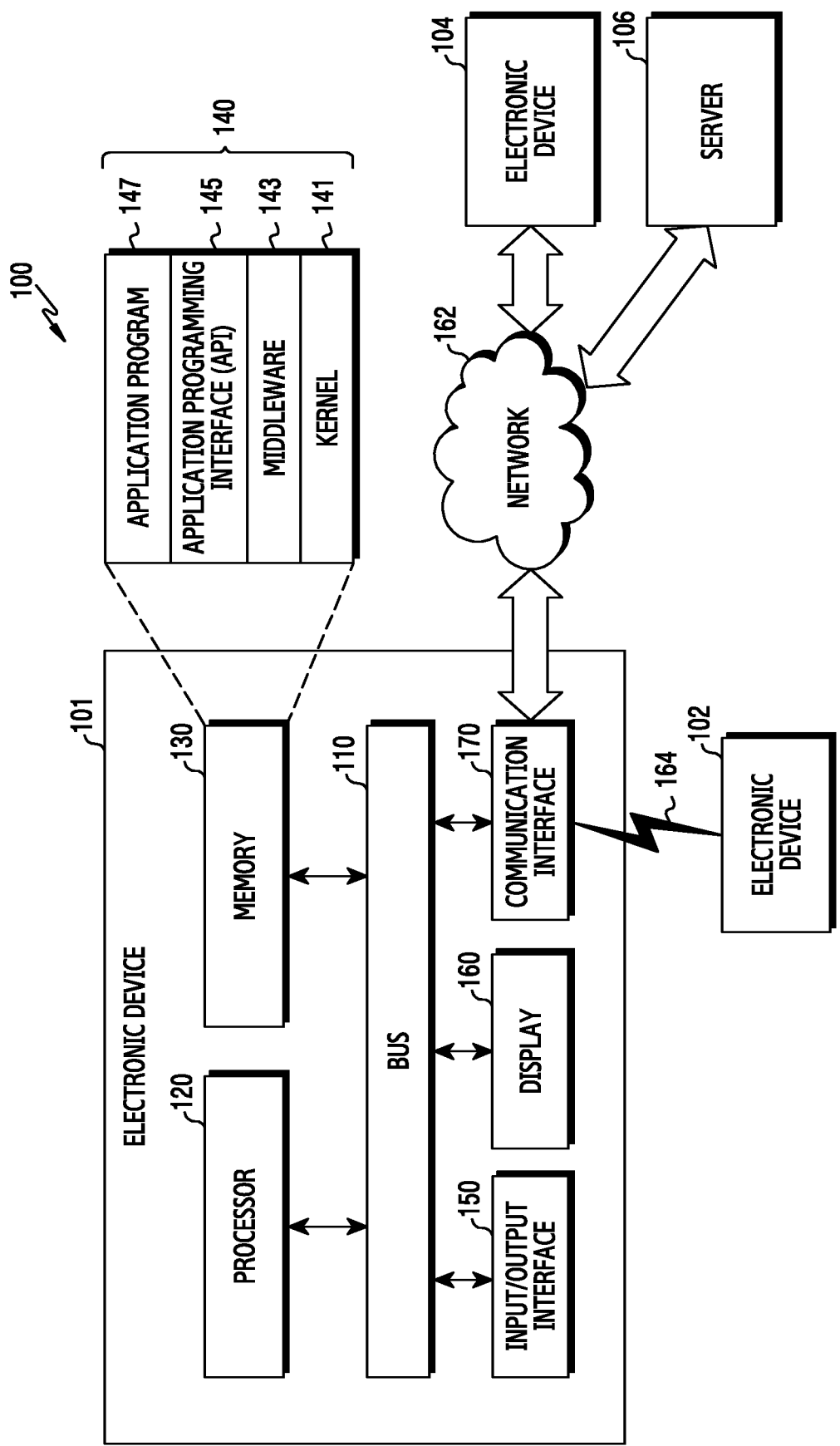
FIG. 1 illustrates a network environment including an electronic device according to various example embodiments of the present disclosure.

Various example embodiments of the present disclosure are described in greater detail below with reference to the accompanying drawings. The same or similar components may be designated by the same or similar reference numerals even though they are illustrated in different drawings. Detailed descriptions of constructions or processes known in the art may be omitted to avoid obscuring the subject matter of the present disclosure.

The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" include plural references unless the context clearly dictates otherwise. In the present disclosure, an expression such as "A or B," "at least one of A and B," or "one or more of A and B" may include all possible combinations of the listed items. Expressions such as "first," "second," "primary," or "secondary," as used herein, may represent various elements regardless of order and/or importance, and do not limit corresponding elements. The expressions may be used for distinguishing one element from another element. When it is described that an element (such as a first element) is operatively or communicatively "coupled to" or "connected to" another element (such as a second element), the element can be directly connected to the other element or can be connected through another element (such as a third element).

The expression "configured to (or set)", as used in the present disclosure, may be used interchangeably with, for example, "suitable for," "having the capacity to," "designed to," "adapted to," "made to," or "capable of" according to the situation. The term "configured to (or set)" does not only refer to "specifically designed to" by hardware. Alternatively, in some situations, the expression "apparatus configured to" may refer to a situation in which the apparatus "can" operate together with another apparatus or component. For example, the phrase "a processor configured (or set) to perform A, B, and C" may be, for example, and without limitation, a dedicated processor, a generic-purpose processor (such as a central processing (CPU) or an application processor (AP)) that can perform a corresponding operation by executing at least one software program stored at an exclusive processor (such as an embedded processor) for performing a corresponding operation or at a memory device.

An electronic device, according to example embodiments of the present disclosure, may be embodied as, for example and without limitation, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, or the like. The wearable device can include, without limitation, at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), and an implantable circuit, or the like. The electronic device may be embodied as at least one of, for example and without limitation, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, or the like.

In another example embodiment, the electronic device may be embodied as at least one of various medical devices such as various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for ship (such as, a navigation device for ship and gyro compass), avionics, a security device, a head unit for a vehicle, an industrial or home robot, a drone, an automated teller machine (ATM) of a financial institution, a point of sales (POS) device of a store, and an Internet of things (IoT) device (e.g., a light bulb, various sensors, a sprinkler device, a fire alarm, a thermostat, a street light, a toaster, sports equipment, a hot water tank, a heater, and a boiler), or the like, but is not limited thereto.

According to an example embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device), or the like, but is not limited thereto. An electronic device, according to an example embodiment, can be a flexible electronic device or a combination of two or more of the foregoing various devices. An electronic device is not limited to the foregoing devices may be embodied as a newly developed electronic device. The term "user", as used herein, can refer to a person using an electronic device or a device using an electronic device (e.g., an artificial intelligence electronic device).

FIG. 1 is a block diagram illustrating a network environment system 100 according to various example embodiments of the present disclosure.

Referring to FIG. 1, electronic devices 101, 102, 104 and/or a server 106 may be connected to each other via a network 162 and/or via wireless (e.g., short-range) communication 164. The electronic device 101 can include a bus 110, a processor (e.g., including processing circuitry) 120, a memory 130, an input/output interface (e.g., including input/output circuitry) 150, a display 160, and a communication interface (e.g., including communication circuitry) 170. The electronic device 101 may be provided without at least one of the components, or may include at least one additional component.

The bus 110 can include a circuit for connecting the components 120, 130, 150, 160, and 170 and delivering communication signals (e.g., control messages or data) therebetween.

The processor 120 may include various processing circuitry, such as, for example, and without limitation one or more of a dedicated processor, a CPU, an application processor, and a Communication Processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an example embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted thereto from the other component(s) of the electronic device 101 to the user or another external device.

The display 160, for example, can include, without limitation, a Liquid Crystal Display (LCD), a Light Emitting Diode (LED) display, an Organic Light Emitting Diode (OLED) display, a MicroElectroMechanical Systems (MEMS) display, or an electronic paper display, or the like. The display 160, for example, can display various content (e.g., text, images, videos, icons, and/or symbols) to the user. The display 160 can include a touch screen, for example, and receive touch, gesture, proximity, or hovering inputs by using an electronic pen or a user's body part (e.g., one or more fingers).

The communication interface 170 may include various communication circuitry and, for example, can set a communication between the electronic device 101 and an external device (e.g., an electronic device 102, a second electronic device 104, and/or a server 106). For example, the communication interface 170 can communicate with the external device (e.g., the second external electronic device 104 or the server 106) over a network 162 through wireless communication or wired communication. The communication interface 170 may additionally communicate with an electronic device (e.g., the electronic device 102) using a short-range wireless communication connection 164.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, as shown by element 164 of FIG. 1, at least one of Wireless Fidelity (WiFi), LiFi (light fidelity), Bluetooth, Bluetooth Low Energy (BLE), Zigbee, Near Field Communication (NFC), magnetic secure transmission, Radio Frequency (RF), and Body Area Network (BAN). The wireless communication can include GNSS. GNSS can include, for example, Global Positioning System (GPS), Global Navigation Satellite System (GLONASS), Beidou navigation satellite system (Beidou), or Galileo (the European global satellite-based navigation system). Hereafter, GPS can be interchangeably used with GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to example embodiments of the present disclosure, all or part of operations executed in the electronic device 101 can be executed by another electronic device or a plurality of electronic devices (e.g., the electronic device 102 and/or 104, and/or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
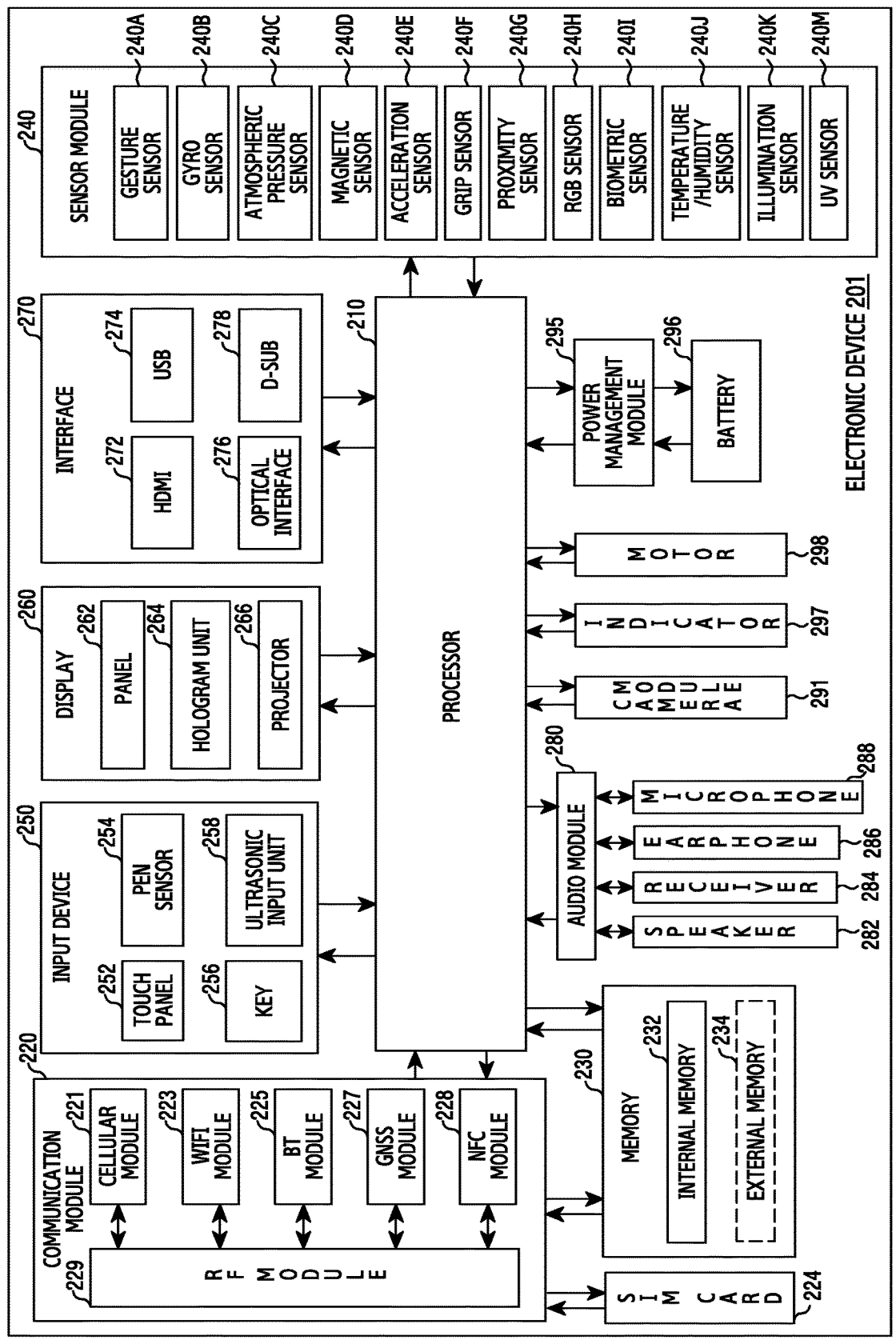
FIG. 2 is a block diagram of an electronic device according to various example embodiments.

FIG. 2 is a block diagram illustrating an example electronic device 201 according to an example embodiment of the present disclosure.

The electronic device 201, for example, can include all or part of the above-described electronic device 101 of FIG. 1. The electronic device 201 may include one or more processors (e.g., an AP) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210, for example, may include various processing circuitry and can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components illustrated in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 may include various communication circuitry, such as, for example, and without limitation, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224.

The cellular module 221 can perform at least part of a function that the processor 210 provides. The cellular module 221 can further include a communication processor (CP). At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another example embodiment, at least one of the cellular module 221, the WiFi module 223, the BT module 225, the GNSS module 227, and the NFC module 228 can transmit/receive an RF signal through an additional RF module.

The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and an external memory 234. The internal memory 232 can include at least one of, for example, a volatile memory (e.g., Dynamic RANI (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a Red, Green, Blue (RGB) sensor), a biometric sensor 240I, a temperature/humidity sensor 240J, an illumination sensor 240K and an ultraviolet (UV) sensor 240M. In addition or alternatively, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include control circuitry for controlling at least one sensor therein. The electronic device, as part of the processor 210 or individually, can further include a processor configured to control the sensor module 240 and thus control the sensor module 240 while the processor 210 is sleeping.

The input device 250 may include various input circuitry, such as, for example, and without limitation, at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input through a microphone 288 and check data corresponding to the detected ultrasonic waves.

The display 260 (e.g., the display 160) can include at least one of a panel 262, a hologram device 264, a projector 266, and/or control circuitry for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201.

The interface 270 may include various interface circuitry, such as, for example, and without limitation, an HDMI 272, a USB 274, an optical interface 276, and/or a D-subminiature (D-sub) 278. The interface 270 can be included in, for example, the communication interface 170 of FIG. 1. Additionally or alternately, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), and a flash (e.g., an LED or a xenon lamp). The power management module 295, for example, can manage the power of the electronic device 201. According to an example embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an example embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
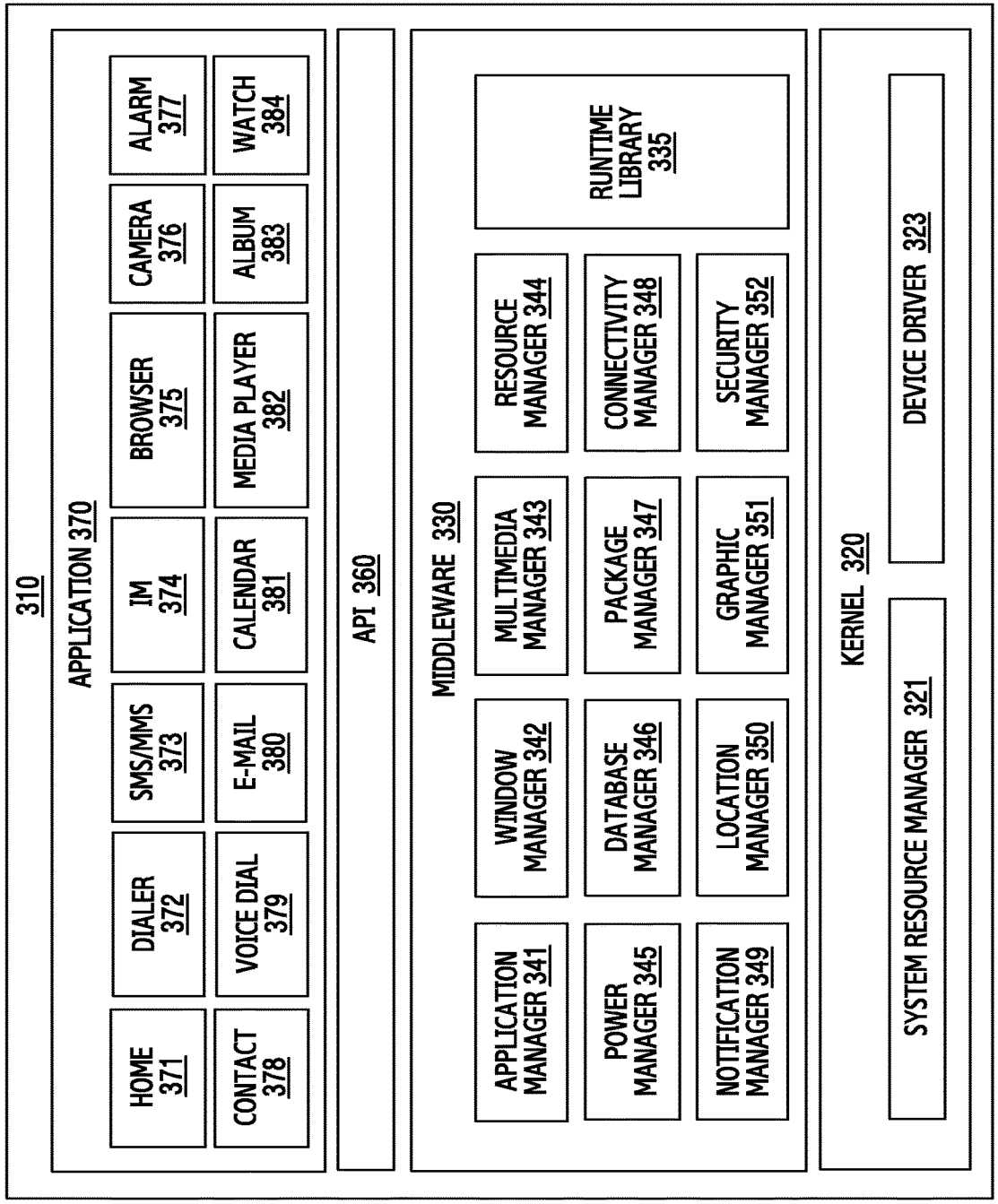
FIG. 3 is a block diagram of a program module according to various example embodiments.

FIG. 3 is a block diagram illustrating an example program module according to an example embodiment of the present disclosure.

A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Eizen™, or Bada™. Referring to FIG. 3, the program module 310 can include a kernel 320 (e.g., the kernel 141), middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an example embodiment, the system resource manager 321 can include, without limitation, a process management unit, a memory management unit, or a file system management unit. The device driver 323 can include, for example and without limitation, a display driver, a camera driver, a Bluetooth driver, a sharing memory driver, a USB driver, a keypad driver, a WiFi driver, an audio driver, or an Inter-Process Communication (IPC) driver.

The middleware 330, for example, can provide a function commonly required by the application 370, or can provide various functions to the application 370 through the API 360 in order to allow the application 370 to efficiently use a limited system resource inside the electronic device. The middleware 330 includes, without limitation, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 370 or a memory space. The power manager 345 can manage the capacity, temperature, and/or power of the battery, and determine or provide power information for an operation of the electronic device using corresponding information among the capacity, temperature, and/or power of the battery. The power manager 345 can operate together with a Basic Input/Output System (BIOS). The database manager 346 can create, search, or modify a database used in or by the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iOS can provide one API set for each platform, and Tizen can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a watch or clock 384. Additionally, though not shown, the application 370 may include, for example, and without limitation, health care (e.g., measure an exercise amount or blood sugar level), or environmental information (e.g., air pressure, humidity, or temperature information) providing applications. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

Figure 4:
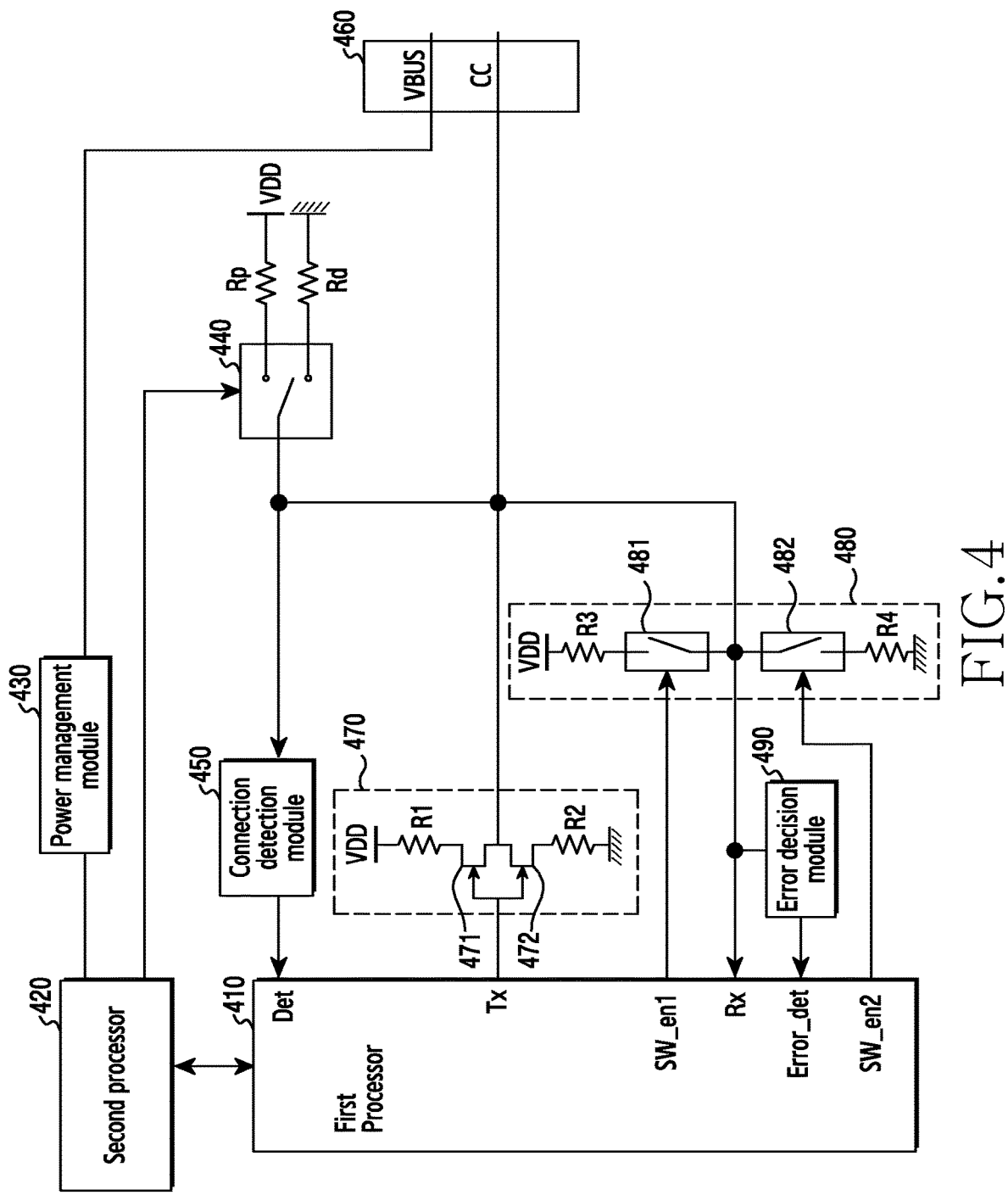
FIG. 4 is a block diagram illustrating a structure of an electronic device according to an example embodiment of the present disclosure.
Figure 5A:
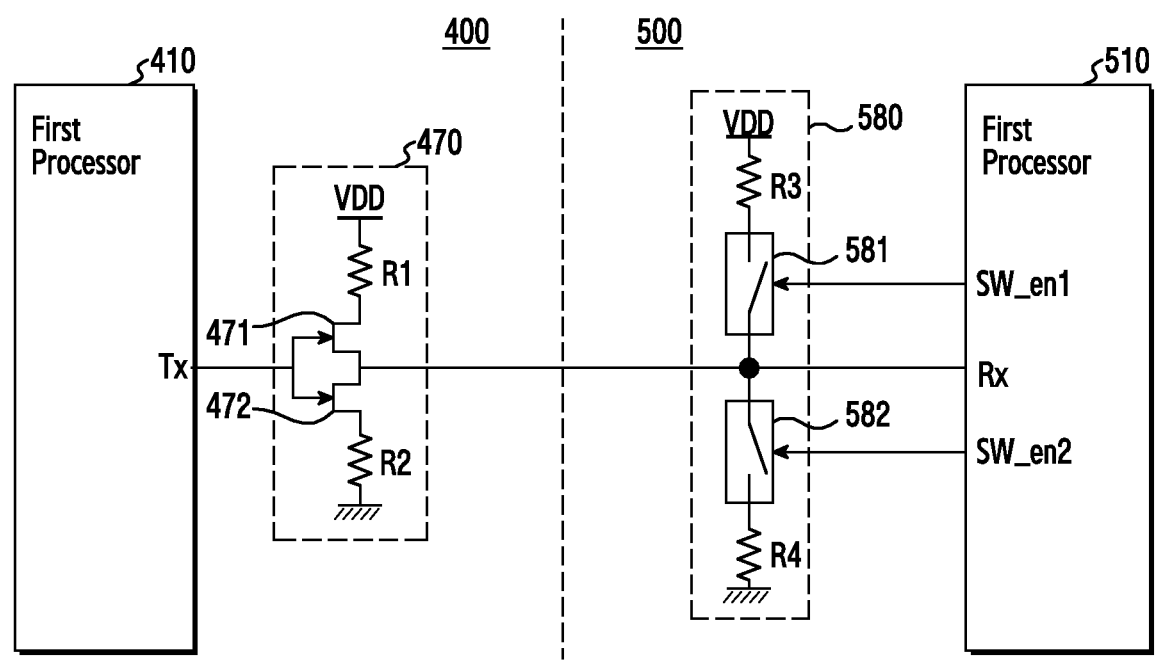
FIGS. 5A, 5B, and 5C illustrate an equivalent circuit of an error detection circuit according to an example embodiment of the present disclosure.
Figure 5B:
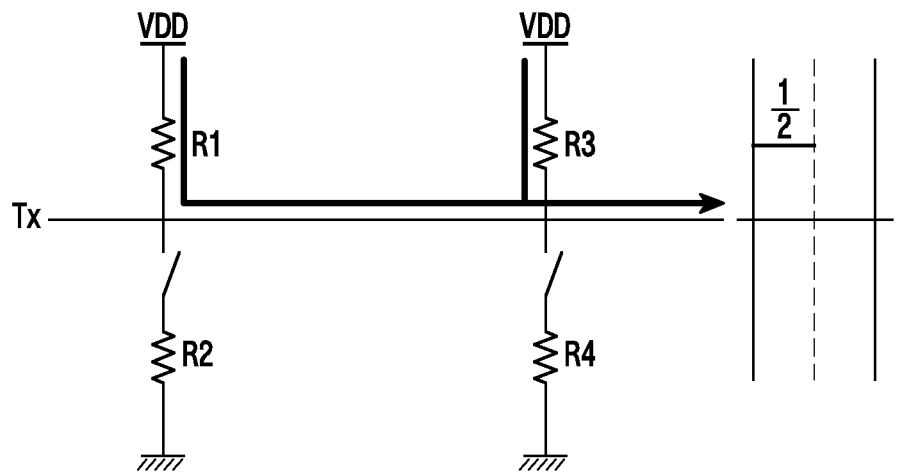
Figure 5B:
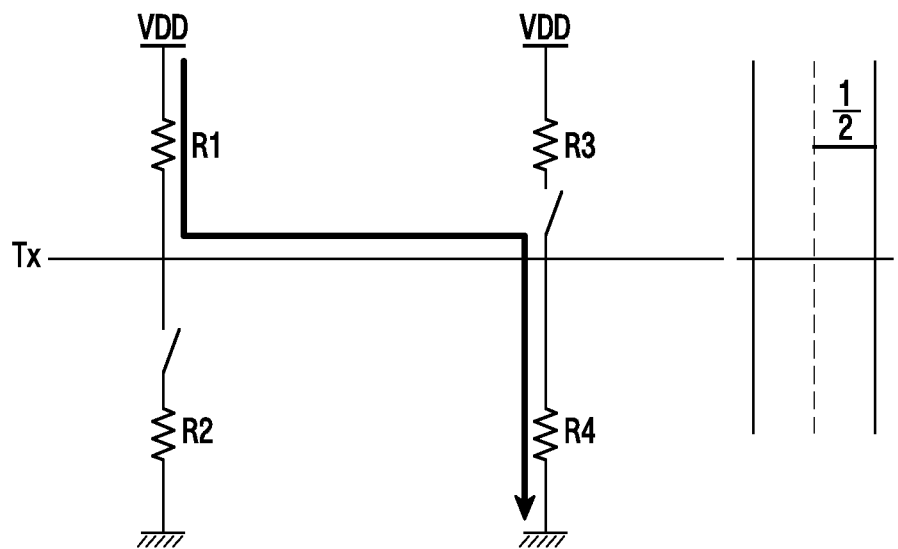
Figure 5C:
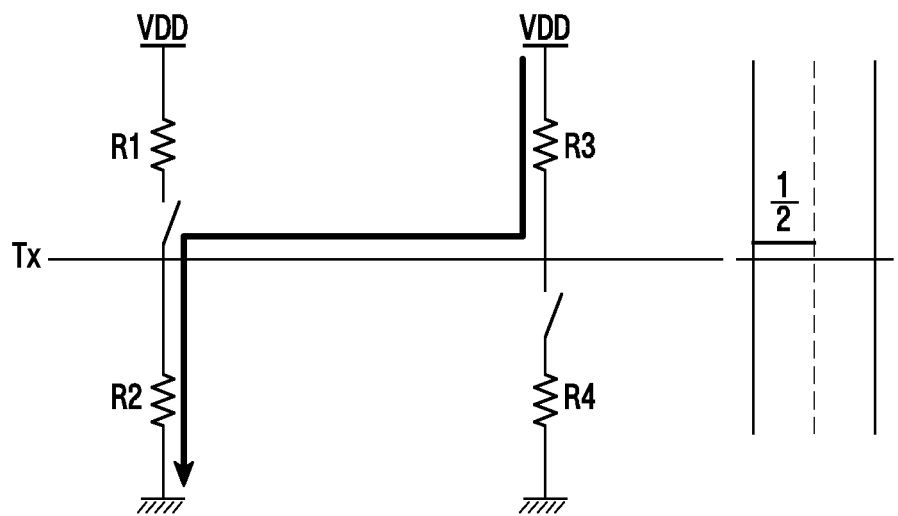
Figure 5C:
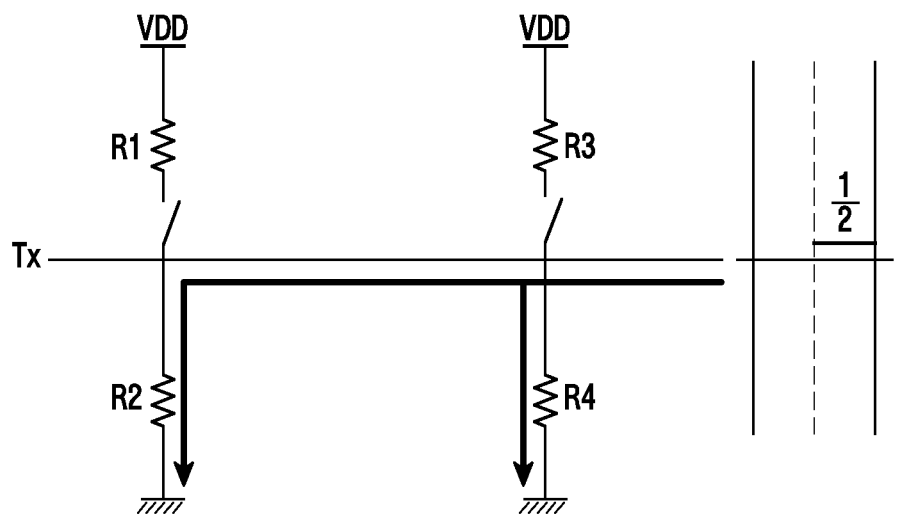
Figure 6:
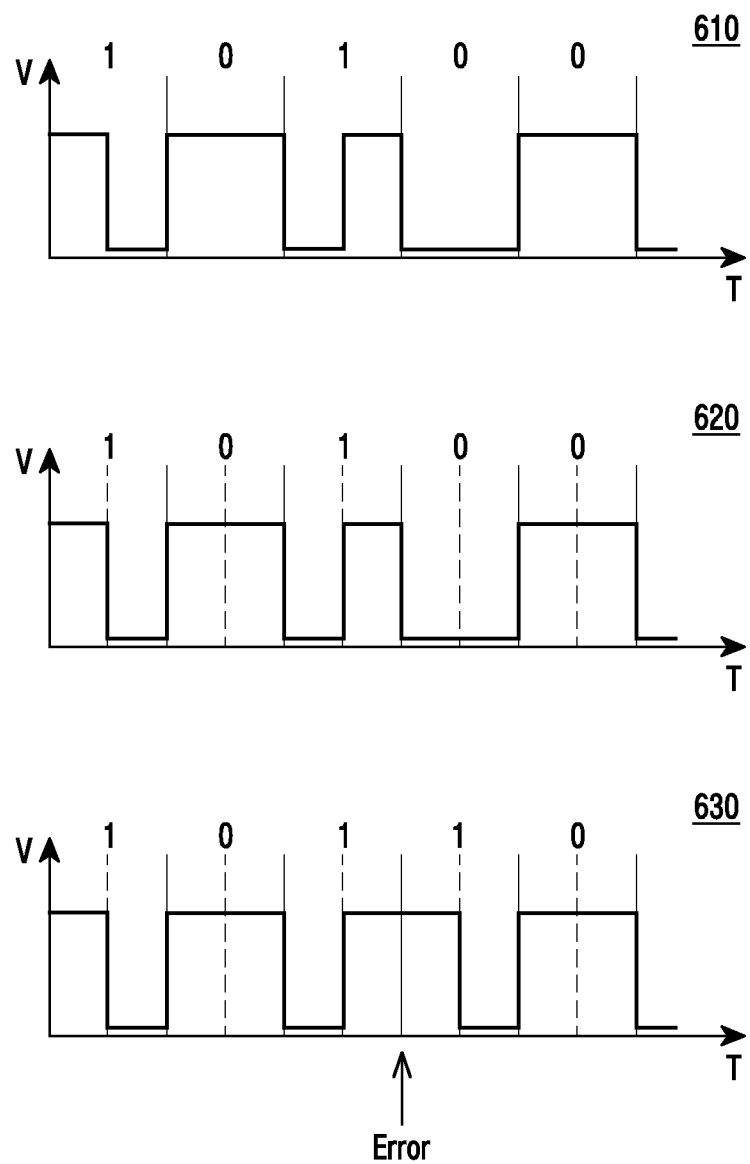
FIG. 6 illustrates an error decision method according to an example embodiment of the present disclosure.

FIG. 4 is a block diagram illustrating a structure of an electronic device according to an example embodiment of the present disclosure. FIGS. 5A, 5B, and 5C illustrate an equivalent circuit of an error detection circuit according to an example embodiment of the present disclosure. FIG. 6 illustrates an error decision method according to an example embodiment of the present disclosure.

Referring to FIG. 4 to FIG. 6, an electronic device 400 according to one example embodiment of the present disclosure may include, for example, all or some parts of the electronic device 101 of FIG. 1 or the electronic device 201 of FIG. 2.

The electronic device 400 may include a first processor 410, a second processor 420, a power management module 430, a switch 440, a connection detection module 450, an interface module 460, an error detection transmission circuit 470, an error detection reception circuit 480, and an error decision module 490. The electronic device 400 may operate as a host or a device when it is connected to an external electronic device. For example, the electronic device 400 may be configured to operate only as the host or only as the device or to operate selectively. The host may be referred to as a Downstream Facing Port (DFP) or a source, and the device may be referred to as an Upstream Facing Port (UFP) or a sink. Hereinafter, the term "host" or "device" may be used for convenience of explanation.

The first processor 410 may control communication with the external electronic device connected through the interface module 460. For example, the first processor 410 may support single-wire communication. The interface module 460 may include a single-wire communication terminal. The single-wire communication terminal may be a Configuration Channel (CC) terminal. The CC terminal may be a first CC terminal CC1 or a second CC terminal CC2, for example, according to a direction of connecting a USB type-C cable. Hereinafter, the term "CC terminal" may be used for convenience of explanation. The first processor 410 may be a PD communication Integrated Circuit (IC) for controlling PD communication which uses a USB type-C CC terminal.

The first processor 410 may include a detection terminal Det for detecting the connection of the external electronic device, a transmission terminal Tx for outputting (transmitting) data, a reception terminal Rx for inputting (receiving) data, a first control terminal SW_en1 for controlling a first switch 481 of the error detection reception circuit 480, a second control terminal SW_en2 for controlling a second switch 482 of the error detection reception circuit 480, and an error detection terminal Error_det.

The first processor 410 may transmit/receive data (packet) in a time-division manner. For example, in case of transmission timing, the first processor 410 may transmit data (packet) to the external electronic device through the transmission terminal Tx. Meanwhile, in case of reception timing, the first processor 410 may receive a packet from the external electronic device through the reception terminal Rx. In case of the reception timing, the first processor 410 may output a first control signal for controlling a switching operation of the first switch 481 included in the error detection reception circuit 480 through the first control terminal SW_en1, and may output a second control signal for controlling a switching operation of the second switch 482 included in the error detection reception circuit 480 through the second control terminal SW_en2. According to a certain example embodiment, the first control terminal SW_en1 and the second control terminal SW_en2 may be formed as one entity. In this case, the first switch 481 and the second switch 482 may be switches which operate in opposite manners. For example, the first switch 481 may be activated (or on) when a high signal is input (i.e., an active high type), and the second switch 482 may be activated when a low signal is input (i.e., an active low type). According to another example embodiment, the first switch 481 and the second switch 482 may be formed as a switching module such as the first switching module 471 and second switching module 472 included in the error detection transmission circuit 470.

The first processor 410 according to one example embodiment of the present disclosure may detect error occurrence by using the error detection terminal Error_det while receiving a packet from the external electronic device. Upon detecting an error occurrence, the first processor 410 may transmit a message (command) for requesting retransmission of an erroneous packet to the external electronic device via the transmission terminal Tx. In addition, upon receiving a message for requesting retransmission of an erroneous packet from the external electronic device through the reception terminal Rx, the first processor 410 may retransmit the requested packet to the external electronic device through the transmission terminal Tx.

Meanwhile, if an error is not detected, the first processor 410 may perform a packet handling procedure. For example, the first processor may perform a procedure such as, without limitation, filtering, squelch detection, demodulation (e.g., Frequency Shift Key (FSK) demodulation), Start Of Packet (SOP) detection, decoding (e.g., 5b4b decoding), cyclic redundancy check, or the like.

The second processor 420 may control an overall operation of the electronic device 400. For example, the second processor 420 may control each of the elements constituting the electronic device 400. The second processor 420 may receive instructions from a memory (not shown) and control each of the elements according to the received instructions to perform various functions.

The second processor 420 may be configured as a Central Processing Unit (CPU), an Application Processor (AP), a Micro Control Unit (MCU), a Micro Processor Unit (MCU), or the like. The second processor 420 may be configured as a single-core processor or a multi-core processor. In another example embodiment, the second processor 420 may be a multi-processor formed of a plurality of processors. For example, the second processor 420 may include an Application Processor (AP) and a Communication Processor (CP). In another example embodiment, the second processor 420 may include a high-power processor (e.g., AP) and a low-power processor (e.g., MPU).

The second processor 420 according to one example embodiment of the present disclosure may control the switch 440. For example, the second processor 420 may control the switch 440 such that the CC terminal is connected to a first pull-up resistor Rp when the electronic device 400 operates as a host, and may control the switch 440 such that the CC terminal is connected to a first pull-down resistor Rd when the electronic device 400 operates as a device. A default state of the switch 440 may be a state in which the CC terminal is connected to the first pull-up resistor Rp.

According to a certain example embodiment, if the electronic device 400 operates only as the device, the switch 440 and the first pull-up resistor Rp may be omitted. Similarly, if the electronic device 400 operates only as the host, the switch 440 and the first pull-down resistor Rd may be omitted.

The power management module (e.g., including power management circuitry) 430 may be connected to a power terminal VBUS of the interface module 460. For example, the power management module 430 may supply power to the external electronic device through the power terminal VBUS. In addition, the power management module 430 may control power supplied to each of elements (e.g., the first processor 410, the second processor 420, the connection detection module 450, the error detection transmission circuit 470, the error detection reception circuit 480, the error decision module 490, etc.) of the electronic device 400.

The switch 440 may be switched by means of the second processor 420. For example, the switch 440 may be a Single Pole Dual Throw (SPDT) type switch. The switch 440 may be switched such that the first pull-up resistor Rp is connected to the CC terminal in a default state (e.g., a state in which a signal less than or equal to a preset value (e.g., 0.5V) (a low signal) is input), and such that the first pull-down resistor Rd is connected to the CC terminal when a high signal (e.g., a signal exceeding the preset value (e.g., 0.5V)) is input. According to a certain example embodiment, the switch 440 may be switched such that the first pull-down resistor Rd is connected to the CC terminal when in it is the default state, and such that the first pull-up resistor Rp is connected to the CC terminal when the high signal is input.

According to a certain example embodiment, if the electronic device 400 operates only as the host or the device, the switch 440 may be omitted.

The connection detection module (e.g., including connection detection circuitry) 450 may detect whether the external electronic device is connected through the interface module 460. For example, the connection detection module 450 may determine whether the external electronic device is connected by checking a voltage change in the CC terminal. When the electronic device 400 operates as the host, the first pull-up resistor Rp of the electronic device 400 may be connected to the first pull-down resistor Rd of the external electronic device which operates as the device. In this case, voltage divided by the first pull-up resistor Rp of the electronic device 400 and the first pull-down resistor Rd of the external electronic device may be input to the connection detection module 450. The connection detection module 450 may determine (or recognize) that the external electronic device is connected when the input of the divided voltage is detected, and may transmit a signal indicative of the connection to the first processor 410. In addition, the connection detection module 450 may recognize a direction of connecting a USB type-C cable. Since such procedures conform to the USB type-C standard, detailed descriptions thereof will be omitted.

According to a certain example embodiment, the connection detection module 450 may be included in the first processor 410. According to another example embodiment, the connection detection module 450 may be included in the second processor 420 or the power management module 430.

The interface module 460 may be an interface device (e.g., including interface circuitry) for connecting with an external electronic device. The interface module 460 may support the USB type C standard. For example, the interface module 460 may include the CC terminal and the VBUS terminal. Meanwhile, although not shown in FIG. 4, the interface module 460 may further include terminals based on the USB type C standard.

The error detection transmission circuit 470 and the error detection reception circuit 480 are circuits for detecting an error which may occur due to external noise and/or unstable power during PD communication. The error detection transmission circuit 470 and the error detection reception circuit 480 may be located between the CC terminal and the first processor 410. According to a certain example embodiment, the error detection transmission circuit 470 and the error detection reception circuit 480 may be included in the first processor 410.

Hereinafter, the error detection transmission circuit 470 and the error detection reception circuit 480 will be described in detail with reference to FIGS. 5A, 5B and 5C.

FIG. 5A illustrates an equivalent circuit of an error detection circuit when the electronic device 400 operates as a host, an external electronic device 500 operates as a device, the electronic device 400 transmits data, and the external electronic device 500 receives the data.

Referring to FIG. 5A, the first processor 410 of the electronic device 400 may output (transmit) data to the error detection transmission circuit 470 according to a clock for PD communication. In this case, the first processor 510 of the external electronic device 500 may provide an on/off control to a first switch 581 and second switch 582 of the error detection reception circuit 580 according to the clock. For example, the first processor 510 of the external electronic device 500 may turn on the first switch 581 and turn off the second switch 582 during a ½ cycle on the basis of one clock cycle, and may turn off the first switch 581 and turn on the second switch 582 during a next ½ cycle.

When the first processor 410 of the electronic device 400 according to one example embodiment of the present disclosure outputs a high signal, the first switching module 471 of the error detection transmission circuit 470 may be turned on, and the second switching module 472 may be turned off. As such, the first switching module 471 and the second switching module 472 may operate in an opposite manner. Herein, the first switching module 471 and the second switching module 472 may be, without limitation, a semiconductor such as a Field Effect Transistor (FET), a Bipolar Junction Transistor (BJT), or the like.

If the first switch 581 of the error detection reception circuit 580 of the external electronic device 500 is turned on and the second switch 582 thereof is turned off while the first processor 410 of the electronic device 400 transmits a high signal, as shown in the figure indicated by a reference numeral 510 of FIG. 5B, an output of the error detection reception circuit 580 may be a high signal due to a second pull-up resistor R1 and a third pull-up resistor R3. Meanwhile, if the first switch 581 of the error detection reception circuit 580 of the external electronic device 500 is turned off and the second switch 582 thereof is turned on while the first processor 410 of the electronic device 400 transmits a high signal, as shown in the figure indicated by a reference numeral 520 of FIG. 5B, the output of the error detection reception circuit 580 may have voltage divided by the second pull-up resistor R1 and a third pull-up resistor R4. In this case, since the third pull-down resistor R4 is configured to have a significantly greater value than the second pull-up resistor R1, the output of the error detection reception circuit 580 may be a high signal. For example, the second pull-up esistor R1 may be a strong pull-up resistor of several or tens of ohms, and the third pull-down resistor R4 may be a weak pull-down resistor of tens of kilos of ohms or hundreds of kilos of ohms.

Meanwhile, if the first processor 410 of the electronic device 400 according to one example embodiment of the present disclosure outputs a low signal, the first switching module 471 of the error detection transmission circuit 470 may be turned off, and the second switching module 472 thereof may be turned on. If the first switch 581 of the error detection reception circuit 580 of the external electronic device 500 is turned on and the second switch 582 thereof is turned off while the first processor 410 of the electronic device 400 transmits a low signal, as shown in the figure indicated by a reference numeral 530 of FIG. 5C, the output of the error detection reception circuit 580 may have voltage divided by the third pull-up resistor R3 and a second pull-down resistor R2. In this case, since the third pull-up resistor R3 is configured to have a significantly greater value than the second pull-down resistor R2, the output of the error detection reception circuit 580 may be a low signal. For example, the second pull-down resistor R2 may be a strong pull-up resistor of several or tens of ohms, and the third pull-up resistor R3 may be a weak pull-down resistor of tens of kilos of ohms or hundreds of kilos of ohms.

Meanwhile, if the first switch 581 of the error detection reception circuit 580 of the external electronic device 500 is turned off and the second switch 582 thereof is turned on while the first processor 410 of the electronic device 400 transmits a low signal, as shown in the figure indicated by a reference numeral 540 of FIG. 5C, the output of the error detection reception circuit 580 may be a low signal due to the second pull-down resistor R2 and the third pull-down resistor R4.

As described above with reference to FIG. 5B and FIG. 5C, the output of the error detection reception circuit 580 according to one example embodiment of the present disclosure may have the same value as a transmission signal irrespective of an on/off state of the first switch 581 and the second switch 582.

The error decision module (e.g., including error decision circuitry) 490 may monitor an output signal of the error detection reception circuit 480, and may decide whether an error occurs on the basis of a result of the monitoring. For example, if the output signal of the error detection reception circuit 480 is changed "from high to low" or "from low to high" at each clock cycle, the error decision module 490 may decide that the error does not occur. On the contrary, if the output signal of the error detection reception circuit 480 is not changed "from high to low" or "from low to high" at each clock cycle, the error decision module 490 may decide that the error does not occur.

For example, referring to FIG. 6, it is assumed that the electronic device 400 according to one example embodiment of the present disclosure receives data "10100" as shown in the figure indicated by a reference numeral 610. In the figure indicated by the reference numeral 610, data "1" may imply that a value is changed during one clock cycle in PD communication, and data "0" may imply that the value is not changed. In addition, it may be known that the value is changed at each clock cycle in PD communication.

On the basis of such a characteristic of the PD communication, if the error does not occur, the output of the error detection reception circuit 480 may have a waveform as shown in the figure indicated by a reference numeral 620, which is the same waveform as the figure indicated by the reference numeral 610. However, if the error occurs, the output of the error detection reception circuit 480 may maintain the same value (e.g., high) as in a previous cycle without having to change a value at an error occurrence time (a time at which a clock cycle is changed from a third cycle to a fourth cycle) as shown in the figure indicated by a reference numeral 630. As such, if the value is not changed when the clock cycle is changed, the error decision module 490 may determine that an error occurs, and may transmit a signal corresponding to this determination to the error detection terminal Error_det of the first processor 410.

According to a certain example embodiment, the error decision module 490 may be included in the first processor 410.

Meanwhile, although not shown in FIG. 4, the electronic device 400 may not include some of constitutional elements described above. In another example embodiment, the electronic device 400 may further include at least one different constitutional element (e.g., a digital broadcasting module, a fingerprint recognition sensor, a memory, a battery, etc.) having the same level as the aforementioned constitutional elements.

According to example embodiment of the present disclosure, an electronic device (e.g., the electronic device (101), the electronic device (201), the electronic device (400)) may comprise an interface module (e.g., the communication interface (170), the interface (270), the interface module (460)) comprising a communication terminal (e.g., CC terminal) for single-wire communication (e.g., PD communication); an error detection circuit (e.g., the error detection transmission circuit (470), the error detection reception circuit (480)) connected to the communication terminal; and at least one processor (e.g., the processor (120), the processor (210), the processor (410), the error decision module (490)) operatively coupled to the error detection circuit, wherein the at least one processor is configured to monitor an output of an error detection circuit located between the communication terminal and the at least one processor while receiving a packet from an external electronic device when performing single-wire communication with the external electronic device connected through the interface module, and detect whether an error occurs based on a result of the monitoring.

According to various example embodiments, the at least one processor is further configured to decide that the error occurs if the output of the error detection circuit is not changed at each clock cycle of the single-wire communication.

According to various example embodiments, the at least one processor is further configured to request the external electronic device to retransmit an erroneous packet if error occurrence is detected, and perform a packet handling procedure if the error occurrence is not detected.

According to various example embodiments, the interface module is further configured to support a Universal Serial Bus (USB) type-C standard, and the communication terminal is one of a first Configuration Channel (CC) terminal and a second CC terminal.

According to various example embodiments, the electronic device further comprises: a first pull-up resistor connected to the communication terminal when the electronic device operates as a host; a first pull-down resistor connected to the communication terminal when the electronic device operates as a device; and a switch configured to perform switching such that the first pull-up resistor or the first pull-down resistor is connected to the communication terminal.

According to various example embodiments, the error detection circuit comprises: an error detection transmission circuit connected to a transmission terminal of the first processor; and an error detection reception circuit connected to a reception terminal of the first processor.

According to various example embodiments, the error detection transmission circuit comprises: a second pull-up resistor of which one side is connected to a power terminal; a first switching module which is connected to the other side of the second pull-up resistor and which is turned on when a first signal is input from the transmission terminal and is turned off when a second signal different from the first signal is input; a second switching module which is connected to the first switching module and which is turned on when the second signal is input from the transmission terminal and is turned off when the first signal is input; and a second pull-down resistor located between the second switching module and a ground.

According to various example embodiments, the second pull-up resistor is a strong pull-up resistor, and the second pull-down resistor is a strong pull-down resistor.

According to various example embodiments, the error detection reception circuit comprises: a third pull-up resistor of which one side is connected to a power terminal; a first switch which is connected to the other side of the third pull-up resistor and which is switched according to a first controls signal output from a first control terminal; a second switch which is connected to the first switch and which is switched according to a second control signal output from a second control terminal; and a third pull-down resistor located between the second switch and a ground, wherein the first control signal is a signal which turns on the first switch during a ½ cycle of each clock and turns off the first switch during the remaining ½ cycle when receiving the packet, and wherein the second control signal is a signal which turns off the second switch during the ½ cycle of each clock and turns on the second switch during the remaining ½ cycle.

According to various example embodiments, the third pull-up resistor is a weak pull-up resistor, and the third pull-down resistor is a weak pull-down resistor.

Figure 7:
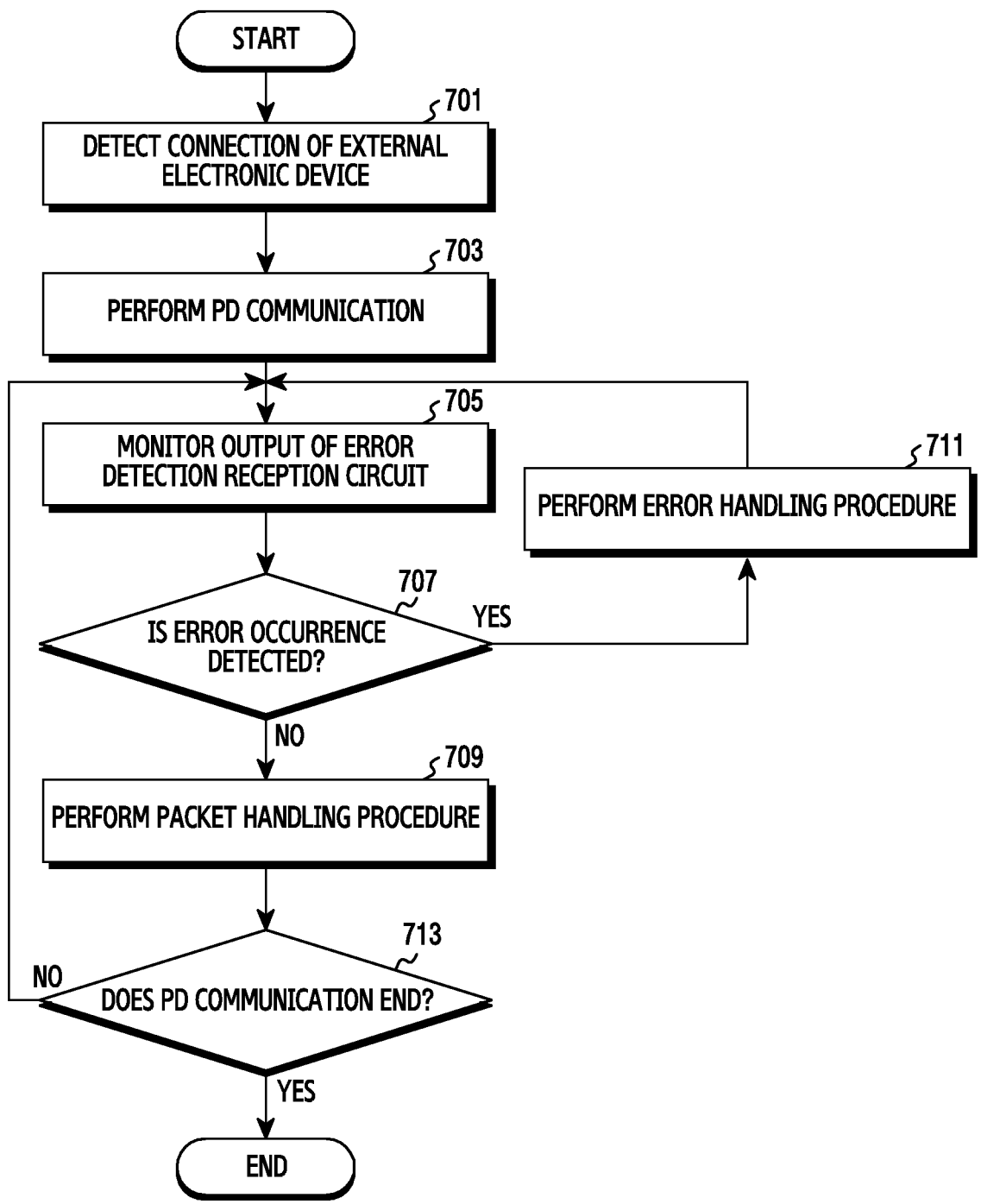
FIG. 7 is a flowchart for describing an error detection method of an electronic device according to an example embodiment of the present disclosure.

FIG. 7 is a flowchart for describing an error detection method of an electronic device according to an example embodiment of the present disclosure.

Referring to FIG. 7, according to various example embodiments of the present disclosure, in operation 701, the electronic device (the first processor 410 of the electronic device 400) may detect a connection of an external electronic device. For example, if the external electronic device is connected through an interface of a USB type-C standard, the electronic device may detect the connection of the external electronic device through a voltage change in one of a first CC terminal and a second CC terminal (hereinafter, for convenience of explanation, referred to as a CC terminal). The electronic device may include an error detection circuit (e.g., an error detection transmission circuit and an error detection reception circuit) disposed between the CC terminal and the first processor 410.

In operation 703, the electronic device according to various example embodiments of the present disclosure may perform Power Delivery (PD) communication. For example, upon detecting the connection of the external electronic device, the electronic device may exchange information (e.g., an IDentification (ID), power information (e.g., charging voltage/current), etc.) with the external electronic device through PD communication.

In operation 705, the electronic device according to various example embodiments may monitor an output of the error detection reception circuit (e.g., the error detection reception circuit 480 of FIG. 4). For example, the electronic device may monitor the output of the error detection reception circuit at reception timing of PD communication.

In operation 707, the electronic device according to various example embodiments of the present disclosure may confirm whether error occurrence is detected. For example, the electronic device may confirm (or check) whether the output (e.g., voltage) of the error detection reception circuit is changed at each clock cycle.

If error occurrence is not detected as a result of the confirmation in operation 707, for example if the output is changed, the electronic device may perform operation 709.

In operation 709, the electronic device according to various example embodiments of the present disclosure may perform a packet handling procedure. For example, the electronic device may perform a procedure such as, without limitation, filtering, squelch detection, demodulation (e.g., Frequency Shift Key (FSK) demodulation), Start Of Packet (SOP) detection, decoding (e.g., 5b4b decoding), cyclic redundancy check, or the like.

If the error occurs as the result of the configuration in operation 707, for example, if the output is not changed, the electronic device may perform operation 711.

In operation 711, the electronic device according to various example embodiments of the present disclosure may perform an error handling procedure. For example, the electronic device may request the external electronic device to retransmit an erroneous packet. For example, the electronic device may transmit to the external electronic device a message (command) for requesting for retransmission of the erroneous packet at next transmission timing. Thereafter, the electronic device may return to operation 705.

In operation 713, the electronic device according to various example embodiments of the present disclosure may confirm whether PD communication ends. The ending of the PD communication may include disconnecting of the external electronic device.

If PD communication does not end, the error detection process of the electronic device returns to operation 705 and the aforementioned operations may be repeated. On the other hand, if PD communication ends, the electronic device may end an error detection process according to one example embodiment of the present disclosure.

The aforementioned error detection method according to one example embodiment of the present disclosure performs error detection in a physical end before performing packet demodulation, decoding, cyclic redundancy check, or the like, thereby rapidly and effectively detecting an error. In addition, the error detection method according to one example embodiment of the present disclosure rapidly detects an error and requests for retransmission of an erroneous packet, thereby improving a communication speed.

Meanwhile, PD communication is used for example in the description of FIG. 7. However, the example embodiment of the present disclosure may also apply to various communications of a single-wire type.

According to example embodiments of the present disclosure, an error detection method of an electronic device may comprises: detecting a connection of an external electronic device through an interface module comprising a communication terminal for single-wire communication; performing single-wire communication with the connected external electronic device; monitoring an output of an error detection circuit located between the communication terminal and at least one processor while receiving a packet from the external electronic device; and detecting whether an error occurs based on a result of the monitoring.

According to various example embodiments, the detecting of whether the error occurs comprises determining (deciding) that the error occurs if the output of the error detection circuit is not changed at each clock cycle of the single-wire communication.

According to various example embodiments, the method further includes requesting the external electronic device to retransmit the erroneous packet if the error occurrence is detected; and performing a packet handling procedure if error occurrence is not detected.

According to various example embodiments, the interface module supports a Universal Serial Bus (USB) type-C standard, and the communication terminal is one of a first Configuration Channel (CC) terminal and a second CC terminal.

According to various example embodiments, the error detection circuit comprises: an error detection transmission circuit connected to a transmission terminal of the first processor; and an error detection reception circuit connected to a reception terminal of the first processor.

According to various example embodiments, the error detection transmission circuit comprises: a second pull-up resistor of which one side is connected to a power terminal; a first switching module which is connected to the other side of the second pull-up resistor and which is turned on when a first signal is input from the transmission terminal and is turned off when a second signal different from the first signal is input; a second switching module which is connected to the first switching module and which is turned on when the second signal is input from the transmission terminal and is turned off when the first signal is input; and a second pull-down resistor located between the second switching module and a ground.

According to various example embodiments, the error detection reception circuit comprises: a third pull-up resistor of which one side is connected to a power terminal; a first switch which is connected to the other side of the third pull-up resistor and which is switched according to a first controls signal output from a first control terminal; a second switch which is connected to the first switch and which is switched according to a second control signal output from a second control terminal; and a third pull-down resistor located between the second switch and a ground, wherein the first control signal is a signal which turns on the first switch during a ½ cycle of each clock and turns off the first switch during the remaining ½ cycle when receiving the packet, and wherein the second control signal is a signal which turns off the second switch during the ½ cycle of each clock and turns on the second switch during the remaining ½ cycle.

According to example embodiments of the present disclosure, a computer-readable recording medium stores at least one instruction configured to allow at least one processor to perform at least one operation when executed by the at least one processor, wherein the at least one operation may comprise: detecting a connection of an external electronic device through an interface module comprising a communication terminal for single-wire communication; performing single-wire communication with the connected external electronic device; monitoring an output of an error detection circuit located between the communication terminal and at least one processor while receiving a packet from the external electronic device; and detecting whether an error occurs based on a result of the monitoring.

According to various example embodiments, the detecting of whether the error occurs comprises determining (deciding) that the error occurs if the output of the error detection circuit is not changed at each clock cycle of the single-wire communication.

According to various example embodiments, the interface module supports a Universal Serial Bus (USB) type-C standard, and the communication terminal is one of a first Configuration Channel (CC) terminal and a second CC terminal.

Various example embodiments of the present disclosure can detect an error in a Physical (PHY) end without applying a separate algorithm for error detection. For example, the electronic device according to various example embodiments of the present disclosure can rapidly and effectively detect an error in the PHY end before processing received packet data. In addition, various example embodiments of the present disclosure can rapidly detect an error and request a transmitting side to retransmit an erroneous packet, thereby improving an overall communication speed.

The term "module", as used herein, may refer, for example, to a unit including hardware, software, and firmware, or any suitable combination thereof. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an example embodiment of the present disclosure, can include, for example, and without limitation, at least one of a dedicated processor, a CPU, an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on example embodiments of the present disclosure, can be implemented with instructions stored in a non-transitory computer-readable storage medium (e.g., the memory 130) as a program module. When the instructions are executed by a processor (e.g., the processor 120), the processor can perform a function(s) corresponding to the instructions.

The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instructions can include code created by a compiler or code executable by an interpreter.

The module or program module can further include at least one or more components among the aforementioned components, or can omit some of them, or can further include additional other components. Operations performed by a module, program module, or other components of the various example embodiments of the present disclosure can be executed in a sequential, parallel, repetitive, or heuristic manner. In addition, some of the operations can be executed in a different order or may be omitted, or other operations may be added.

Various example embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device comprising:
    an interface module comprising a communication terminal for single-wire communication;
    at least one processor; and
    an error detection circuit connected between the interface module and the at least one processor, to the interface module through the communication terminal; and to the at least one processor through a transmission terminal and a reception terminal, wherein the at least one processor is operatively coupled to the error detection circuit and the interface module to monitor an output of the error detection circuit while receiving a packet from an external electronic device when performing single-wire communication with the external electronic device connected through the interface module, and to detect whether an error occurs based on a result of the monitoring.

2. The electronic device of claim 1, wherein the at least one processor is further configured to determine that the error occurs based on the output of the error detection circuit not changing at each clock cycle of the single-wire communication.

3. The electronic device of claim 1, wherein the at least one processor is further configured to request the external electronic device to retransmit an erroneous packet based on detecting error occurrence, and perform a packet handling procedure based on not detecting error occurrence.

4. The electronic device of claim 1,
wherein the interface module is further configured to support a Universal Serial Bus (USB) type-C standard, and
wherein the communication terminal is one of a first Configuration Channel (CC) terminal and a second CC terminal.

5. The electronic device of claim 1, further comprising:
a first pull-up resistor connected to the communication terminal when the electronic device operates as a host;
a first pull-down resistor connected to the communication terminal when the electronic device operates as a device; and
a switch configured to perform switching such that the first pull-up resistor or the first pull-down resistor is connected to the communication terminal.

6. The electronic device of claim 1, wherein the error detection circuit comprises:
an error detection transmission circuit connected to the transmission terminal of the at least one processor; and
an error detection reception circuit connected to the reception terminal of the at least one processor.

7. The electronic device of claim 6, wherein the error detection transmission circuit comprises:
a pull-up resistor of which one side is connected to a power terminal;
a first switching module which is connected to the other side of the pull-up resistor and which is turned on when a first signal is input from the transmission terminal and is turned off when a second signal different from the first signal is input from the transmission terminal;
a second switching module which is connected to the first switching module and which is turned on when the second signal is input from the transmission terminal and is turned off when the first signal is input from the transmission terminal; and
a pull-down resistor located between the second switching module and ground.

8. The electronic device of claim 7, wherein the pull-up resistor is a strong pull-up resistor, and the pull-down resistor is a strong pull-down resistor.

9. The electronic device of claim 6, wherein the error detection reception circuit comprises:
a pull-up resistor of which one side is connected to a power terminal;
a first switch which is connected to the other side of the pull-up resistor and which is switched according to a first control signal output from a first control terminal;
a second switch which is connected to the first switch and which is switched according to a second control signal output from a second control terminal; and
a pull-down resistor located between the second switch and ground,
wherein the first control signal is a signal which turns on the first switch during a ½ cycle of each clock and turns off the first switch during the remaining ½ cycle when receiving the packet, and
wherein the second control signal is a signal which turns off the second switch during the ½ cycle of each clock and turns on the second switch during the remaining ½ cycle.

10. The electronic device of claim 9, wherein the pull-up resistor is a weak pull-up resistor, and the pull-down resistor is a weak pull-down resistor.

11. An error detection method for an electronic device comprising an error detection circuit connected between at least an interface module and at least one processor, through a communication terminal, and through a transmission terminal and a reception terminal, the method comprising:
detecting a connection of an external electronic device through the interface module comprising the communication terminal for single-wire communication;
performing single-wire communication with the connected external electronic device;
monitoring an output of the error detection circuit located between the communication terminal and the at least one processor while receiving a packet from the external electronic device; and
detecting whether an error occurs based on a result of the monitoring.

12. The method of claim 11, wherein the detecting of whether the error occurs comprises determining that the error occurs based on the output of the error detection circuit not changing at each clock cycle of the single-wire communication.

13. The method of claim 11, further comprising:
requesting the external electronic device to retransmit an erroneous packet based on detecting error occurrence; and
performing a packet handling procedure based on not detecting the error occurrence.

14. The method of claim 11,
wherein the interface module supports a Universal Serial Bus (USB) type-C standard, and
wherein the communication terminal is one of a first Configuration Channel (CC) terminal and a second CC terminal.

15. The method of claim 11, wherein the error detection circuit comprises:
an error detection transmission circuit connected to the transmission terminal of the at least one processor; and
an error detection reception circuit connected to the reception terminal of the at least one processor.

16. The method of claim 15, wherein the error detection transmission circuit comprises:
a pull-up resistor of which one side is connected to a power terminal;
a first switching module which is connected to the other side of the second pull-up resistor and which is turned on when a first signal is input from the transmission terminal and is turned off when a second signal different from the first signal is input;

a second switching module which is connected to the first switching module and which is turned on when the second signal is input from the transmission terminal and is turned off when the first signal is input; and a pull-down resistor located between the second switching module and ground.

17. The method of claim 15, wherein the error detection reception circuit comprises:

a pull-up resistor of which one side is connected to a power terminal;

a first switch which is connected to the other side of the pull-up resistor and which is switched according to a first control signal output from a first control terminal;

a second switch which is connected to the first switch and which is switched according to a second control signal output from a second control terminal; and a pull-down resistor located between the second switch and ground, wherein the first control signal is a signal which turns on the first switch during a ½ cycle of each clock and turns off the first switch during the remaining ½ cycle when receiving the packet, and wherein the second control signal is a signal which turns off the second switch during the ½ cycle of each clock and turns on the second switch during the remaining ½ cycle.

18. A computer-readable recording medium storing at least one instruction configured to allow at least one processor to perform in an electronic device comprising an error detection circuit connected between an interface module and at least one processor, through a communication terminal, and through a transmission terminal and a reception terminal, when executed by the at least one processor, at least one operation comprising:

detecting a connection of an external electronic device through the interface module comprising the communication terminal for single-wire communication;

performing single-wire communication with the connected external electronic device;

monitoring an output of the error detection circuit located between the communication terminal and at least one processor while receiving a packet from the external electronic device; and detecting whether an error occurs based on a result of the monitoring.

19. The recording medium of claim 18, wherein the detecting of whether the error occurs comprises determining that the error occurs based on the output of the error detection circuit not changing at each clock cycle of the single-wire communication.

20. The recording medium of claim 18, wherein the interface module supports a Universal Serial Bus (USB) type-C standard, and wherein the communication terminal is one of a first Configuration Channel (CC) terminal and a second CC terminal.

* * * * *